(12) United States Patent
Kwok et al.

(10) Patent No.: US 8,140,468 B2
(45) Date of Patent: Mar. 20, 2012

(54) SYSTEMS AND METHODS TO EXTRACT DATA AUTOMATICALLY FROM A COMPOSITE ELECTRONIC DOCUMENT

(75) Inventors: Thomas Yu-Kiu Kwok, Washington Township, NJ (US); Thao Ngoc Nguyen, Katonah, NY (US); Kakan Roy, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 12/132,845

(22) Filed: Jun. 4, 2008

(65) Prior Publication Data

US 2008/0235227 A1   Sep. 25, 2008

Related U.S. Application Data

(63) Continuation of application No. 11/472,868, filed on Jun. 22, 2006, now abandoned.

(51) Int. Cl.
G06F 7/00 (2006.01)
G06K 9/46 (2006.01)
(52) U.S. Cl. ........................... 707/600; 382/195
(58) Field of Classification Search .......... 707/6; 382/181; 705/317, 342
See application file for complete search history.

(56) References Cited

U.S. PATENT DOCUMENTS

| 5,835,905 | A  | * | 11/1998 | Pirolli et al.  | 1/1 |
| 5,956,422 | A  | * | 9/1999  | Alam            | 382/181 |
| 5,991,709 | A  | * | 11/1999 | Schoen          | 704/1 |
| 6,202,060 | B1 | * | 3/2001  | Tran            | 707/3 |
| 6,263,335 | B1 | * | 7/2001  | Paik et al.     | 707/5 |
| 6,298,357 | B1 | * | 10/2001 | Wexler et al.   | 715/210 |
| 6,546,133 | B1 | * | 4/2003  | Temkin et al.   | 382/173 |
| 6,601,233 | B1 | * | 7/2003  | Underwood       | 717/102 |
| 6,629,097 | B1 | * | 9/2003  | Keith           | 707/5 |
| 6,775,665 | B1 | * | 8/2004  | Piersol         | 707/4 |
| 7,016,535 | B2 | * | 3/2006  | Waida et al.    | 382/181 |

(Continued)

FOREIGN PATENT DOCUMENTS

WO    WO 98/12616    3/1998

(Continued)

OTHER PUBLICATIONS

Yao-Hua Tan et al., "DocLog: An Electronic Contract Representation Language" Proc of 35th Annual Hawaii Int'l Conf. on System Sciences, pp. 2198-2206; 2002.

(Continued)

*Primary Examiner* — Nathan Flynn
*Assistant Examiner* — Abdullah Almamun
(74) *Attorney, Agent, or Firm* — Tutunjian & Bitetto, P.C.; William J. Stock (57) ABSTRACT

A system and method for automatically extracting contract data from electronic contracts includes an administrator module configured to provide templates for inputting document patterns and a list of contract data tags for each of a plurality of contract document types. A parser is configured to convert an electronic contract document into a contract text document and reformat the contract text document to provide a pattern for the text contract document. A pattern recognition engine is configured to determine a list of contract document types in the electronic contract by comparing and matching patterns of all known contract document types with the pattern of the contract text document. A contract data extraction engine is configured to extract contract data for each contract document type on the list.

20 Claims, 4 Drawing Sheets

U.S. PATENT DOCUMENTS

| | | | | |
|---|---|---|---|---|
| 7,319,799 | B2* | 1/2008 | Berche et al. | 382/306 |
| 7,689,906 | B2* | 3/2010 | Bax et al. | 715/237 |
| 2002/0049705 | A1* | 4/2002 | Haviv-Segal et al. | 707/1 |
| 2003/0038984 | A1* | 2/2003 | Ohkawa | 358/462 |
| 2003/0215137 | A1* | 11/2003 | Wnek | 382/181 |
| 2004/0261016 | A1* | 12/2004 | Glass et al. | 715/512 |
| 2005/0289456 | A1* | 12/2005 | Bier | 715/513 |
| 2006/0100893 | A1* | 5/2006 | Cunningham et al. | 705/1 |
| 2006/0282760 | A1* | 12/2006 | Tanaka | 715/509 |
| 2006/0294101 | A1* | 12/2006 | Wnek | 707/7 |
| 2007/0047816 | A1* | 3/2007 | Graham et al. | 382/181 |

FOREIGN PATENT DOCUMENTS

| | | |
|---|---|---|
| WO | WO 98/16890 | 4/1998 |
| WO | WO 98/55945 | 12/1998 |
| WO | WO 00/45297 | 8/2000 |
| WO | WO 2005/010727 | 2/2005 |

OTHER PUBLICATIONS

F. Griffel et al., "Electronic Contracting with COSMOS—How to Establish, Negatilae and Execute Electronic Contracts on the Internet", Proc of the 2nd Int'l Enterprise Disribuled Object Computing Workshop; pp. 46-55; 1998.

T. Kwok et al., "A Secure Electronic Contract Management and Process System Automated with Predefined Tasks" Proc. of IEEE Int'l Conf. on e-Technology, e-Commerce and e-Service, IEEE Computer Society, pp. 276-281; 2005.

Olivier Perrin et al., "An approach to implement contracts as trusted intermediaries" Proc. of 1st IEEE Int;l Workshop on Electronic Contracting; pp. 71-78, 2004.

M. Iwaihara et al., "An Integrated System for Supporting Problem Solution in e-Contract Execution" Proc. of 1st IEEE Int'l Workshop on Electronic Contracting, pp. 9-16; 2004.

L. Xu et al., "A Concept for monitoring of electronic contracts" Proc. of IEEE Int'l Conf of E-Commerce; pp. 92-99; 2003.

Zoran Milosevic et al., "Discretionary Enforcement of Electronic Contracts" Proc. of 6th Int'l Enterprise Distributed Object Computing Conf, pp. 39-50; 2002.

A. Daskalopulu et al., "Towards Electronic Contract Performance"Proc. of 12th Int'l Workshop on Database and Expert Systems Applications, pp. 771-777; 2002.

T. Kwok et al., "An Automatic Electronic Contract Document Signing System in a Secure Environment", Proc. of 7th IEEE Int'l Conf. on e-Commerce Technology, IEEE Computer Society, pp. 497-502; 2005.

M. Castellanos et al., "Facts: An Approach to Unearth Legacy Contracts", Proc. of 1st IEEE Int'l Workshop on Electronic Contracting; pp. 40-45; 2004.

* cited by examiner

FIG. 4

SYSTEMS AND METHODS TO EXTRACT DATA AUTOMATICALLY FROM A COMPOSITE ELECTRONIC DOCUMENT

RELATED APPLICATIONS INFORMATION

This application is a continuation of U.S. patent Ser. No. 11/472,868, filed Jun. 22, 2006 now abandoned, which is incorporated by reference herein in its entirety.

BACKGROUND

1. Technical Field

The present invention relates to data extraction from documents and more particularly to systems and methods which extract contract data automatically and efficiently from an electronic contract composed of a number of documents in a given format.

2. Description of the Related Art

Much business between enterprises is conducted under contract. Contracts constitute the binding relationship between a company and its customers or suppliers. Everyday, many contracts are created, executed and managed via paper-based manual processes in large enterprises. Automation of the contract lifecycle presents a substantial value creation opportunity for enterprises. This value stems from improved productivity and security, effectively aggregated contract information, accelerated contract lifecycle processes, reduced contractual errors and risk, enabled revenue forecast and profit optimization, as well as better compliance enforcement.

With the advent of Internet technology and electronic commerce, there are growing research activities and implementation efforts on electronic contracts. Currently, the International Association of Contract and Commercial Managers have listed twenty commercially available software products for electronic contract management. Most of the research activities reported is focused on electronic contract creation or representation language, negotiation, management, collaboration, execution, fulfillment and enforcement, performance, digital signatures and data mining. However, none of these aspects has provided an automatic electronic data extraction solution to enable data mining for revenue forecast and profit optimization.

A single electronic contract can encompass a large number of collateral documents including master and customer agreements, supplements, addenda and the like. These various documents are of different contract document types. There can be over a hundred different basic types of contract documents in a large company. A few examples of these contract document types are as follows, "Master Agreement", "Customer Agreement", "Term Lease Supplement", "Addendum to Term Lease Supplement", "Statement of Work for Services", "Change Authorization for Services", etc. Moreover, they can also be in different file formats, such as PDF, XML, Microsoft Word™, Lotus WordPro™.

An electronic contract management system can be used to automatically convert all these contract documents of different types into PDF format and then merge them together to form a single electronic contract PDF document. However, data extraction and mining on this kind of electronic contract is still very difficult if not impossible. To do this, a user should find out how many contract documents are in an electronic contract composed of a number of contract documents, and then determine their contract document types. Next, what contract data to extract should be decided and from which contract document. The user would further need to find out where on the contract document the contract data is located, such as page and line numbers. There are many more tasks to be overcome before one can implement a data extraction and mining on this kind for electronic contracts.

SUMMARY

An electronic contract can encompass a large number of collateral contract documents in, e.g., PDF format. These contract documents are of different contract document types and converted from different original formats. Data extraction and thus data mining for this kind of electronic contracts is very difficult. A novel system and method are presented to automatically extract contract data from these kinds of electronic contracts. The automatic electronic contract data extraction system comprises an administrator module, a PDF parser, a pattern recognition engine and a contract data extraction engine. The administrator module provides templates for inputting document patterns and a list of contract data tags for each contract document type. The administrator module also constructs pattern matrices and stores them in a database.

The PDF parser converts the contract PDF document into the contract text document with the insertion of formatting bookmarks, such as a new page, paragraph or line. The pattern recognition engine determines a list of contract document types in the electronic contract by comparing and matching the patterns of all known contract document types with the pattern of the contract text document. The contract data extraction engine retrieves the corresponding list of contract data tags and then extracts contract data accordingly for each contract document type on the list. The automatic electronic contract data extraction system has been found to be very accurate, efficient and useful in extracting contract data for data mining.

A system and method for automatically extracting contract data from electronic contracts includes an administrator module configured to provide templates for inputting document patterns and a list of contract data tags for each of a plurality of contract document types. A parser is configured to convert an electronic contract document into a contract text document and reformat the contract text document to provide a pattern for the text contract document. A pattern recognition engine is configured to determine a list of contract document types in the electronic contract by comparing and matching patterns of all known contract document types with the pattern of the contract text document. A contract data extraction engine is configured to extract contract data for each contract document type on the list.

Another method for automatically extracting contract data from electronic contracts includes providing templates for inputting document patterns and a list of contract data tags for each of a plurality of contract document types; parsing an electronic contract document to convert the electronic contract document into a contract text document; determining a list of contract document types in the electronic contract by comparing and matching patterns of all known contract document types with the pattern of the contract text document; and extracting contract data for each contract document type on the list.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

An electronic contract can encompass a large number of collateral contract documents in, e.g., a portable document format (PDF). These contract documents may be of different contract document types and converted from different original formats. Data extraction and thus data mining for these kinds of electronic contracts is very difficult. Novel systems and methods will be presented herein to automatically extract contract data from electronic contracts. In one embodiment, an automatic electronic contract data extraction system includes an administrator module, a PDF parser, a pattern recognition engine and a contract data extraction engine.

The administrator module provides templates for inputting document patterns and a list of contract data tags for each contract document type. The administrator module also constructs pattern matrices and stores them in a database. The PDF parser converts the contract PDF document into the contract text document with the insertion of formatting bookmarks, such as a new page, paragraph or line.

The pattern recognition engine determines a list of contract document types in the electronic contract by comparing and matching the patterns of all known contract document types with the pattern of the contract text document. The contract data extraction engine retrieves a corresponding list of contract data tags and then extracts contract data accordingly for each contract document type on the list.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
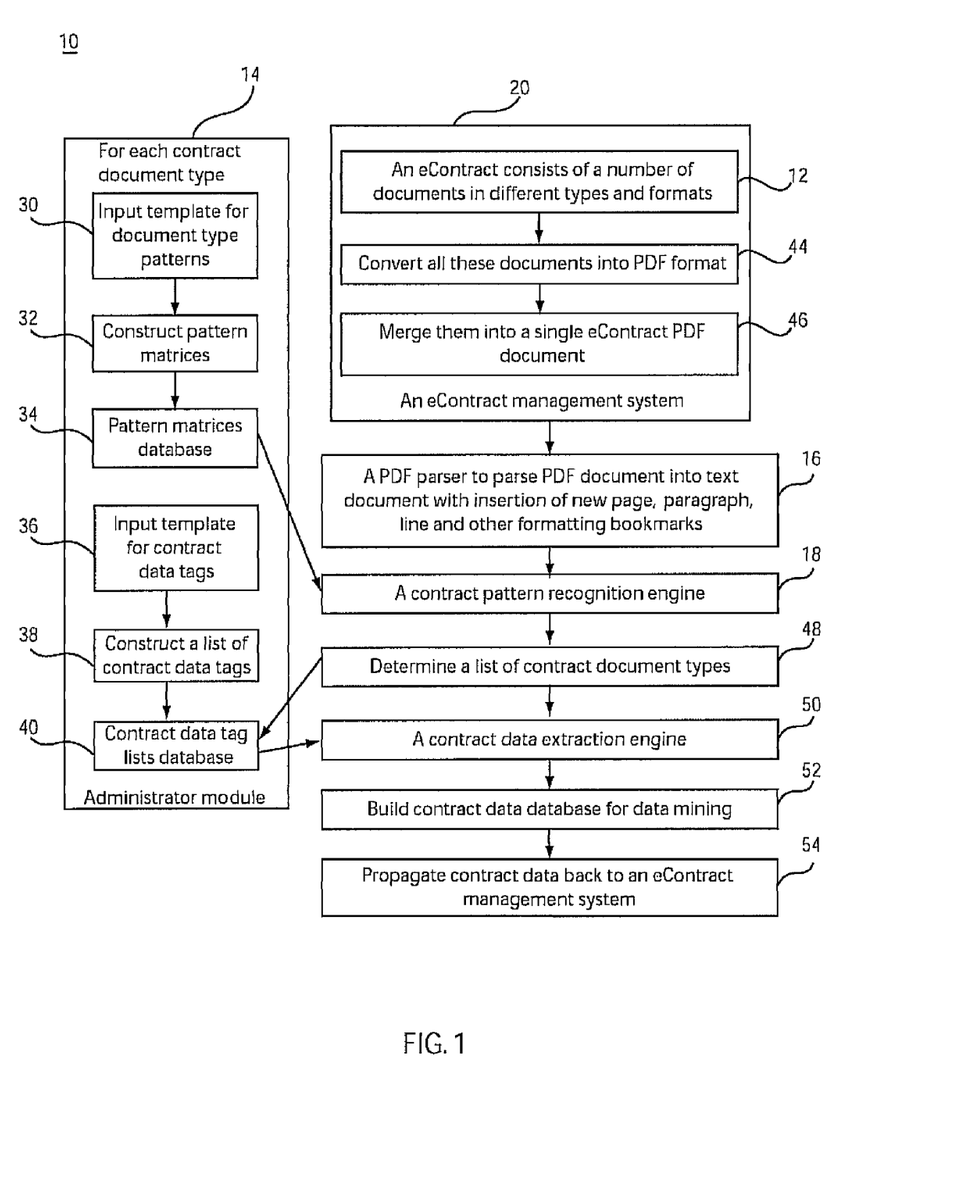
FIG. 1 is a block/flow diagram showing an architecture framework of an automatic data extraction system for electronic contract documents in accordance with one illustrative embodiment.

Referring now to the drawings in which like numerals represent the same or similar elements and initially to FIG. 1, an architectural framework for an automatic contract data extraction system 10 is illustratively shown in accordance with one embodiment. An electronic contract 12 may be composed of a number of documents in, e.g., PDF format. The system 10 in accordance with one embodiment includes an administrator module 14, a (PDF) parser 16, a contract pattern recognition engine 18 and a contract data extraction engine 20. The framework 10 also illustrates the interaction between the PDF parser 16 and an electronic contract management system 20. In one example, a Web-based electronic contract management system 20 may be employed as known in the art. This particular management system 20 converts electronic contracts (eContracts) in a format (e.g., PDF) in block 44. Management system 20 then merges all related documents of an electronic contract into one PDF document in block 46. Documents may be related based on the parties, dates, contract types or any other criteria.

The administrator module 14 provides templates for inputting document patterns in block 30 and contract data tags for each new contract document type in block 36. Note that the steps in block 14 may be performed for each contract type. Patterns include common terms or entered data fields that can be used to identify a contract by its type. Module 14 also constructs pattern matrices in block 32 and generates a list of contract data tags in block 38. The pattern matrices and list of contract data tags are stored in a local or remote database in blocks 34 and 40. Pattern matrices are used to compare the pattern characteristics of all the existing or known contract document types with the contract text document of an electronic contract. Contract data tags include tags for data, metadata or fields of data in a contract.

When a user uploads an electronic contract 12 into a Web-based electronic contract management and process system 20, a PDF parser 16 is used to convert the PDF document into a text document. There are a number of special functions or features in this PDF parser 16. First, the PDF formatting characters or words originally in the PDF document are removed and replaced with either a blank space or line feed in the text document depending on their locations in the contract document. Second, consecutive blank spaces or line feeds are reduced into a single blank space or line feed, respectively. Third, an extra text line with special coding characters or words indicating a new page or a new paragraph is inserted into the text document whenever the parser finds a new page or a new paragraph. Fourth, other special coding characters or formatting bookmarks are also used to indicate a new line, a change of fonts, an image or a picture, as well as to replace other PDF formats. These steps are employed to clean up the text for the recognition steps later on in the process.

These special coding characters or words are readable and decoded by both the contract pattern recognition engine 18 and a contract data extraction engine 50. Then, the pattern recognition engine 18 uses the pattern matrices of all known contract document types from block 34 to determine, in block 48, a list of contract document types in the electronic contract by comparing and matching the pattern matrices with the pattern of the contract text document.

A contract data extraction engine 50 retrieves the corresponding list of contract data tags from block 40 and then extracts contract data accordingly for each contract document type on the list. The retrieved contract data are stored on either the local or remote database for data mining in block 52. In block 54, intrinsic metadata from the retrieved contract data are propagated back to the Web-based electronic contract management and process system 20 to assist the user in filling out the contract input template.

In other words, contract terms may be stored in the database such that when a use is filling out a template on the system a plurality of previously used or available terms are presented for entry into the contract form.

Figure 2:
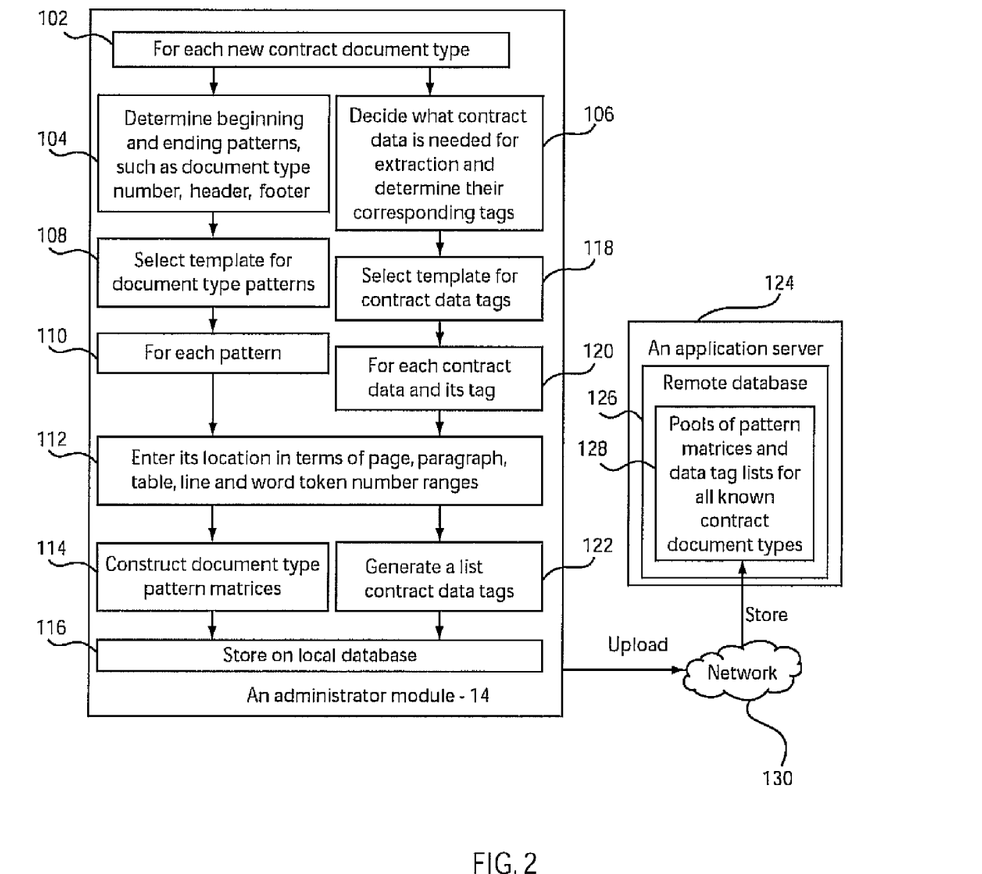
FIG. 2 is a block/flow diagram showing an administrator module in accordance with an illustrative embodiment.

Referring to FIG. 2, illustrative steps are depicted for the administration module 14. An administrator uses the administrator module 14 to construct document type pattern matrices in block 114 and to generate a list of contract data tags in block 122 for each new contract document type entering into the electronic contract management and process system in block 102.

For document type patterns, the administrator first has to determine characteristics of beginning and ending patterns of this new contract document type in block 104. These characteristics should be special or unique to the pattern of this new contract document type and at the same time different from the pattern characteristics of other contract document types. Usually, one to two characteristics for each of the beginning or ending patterns are enough to distinguish this new contract document type from other existing or known contract document types stored in the system. Each pattern characteristic usually involves two to five lines and two to ten words or terms per line. These pattern characteristics can be a specific contract document type number written either on the first or the last page of the contract document.

Characteristics of the beginning pattern are usually the first few lines of descriptions on parties involved in a contract document in the first page. Characteristics of the ending pattern are usually the last few lines of the agreement or signing information of parties involved in a contract document in the last page. Based on these patterns, a template for the contract may be selected from a database which corresponds to the pattern detected in block 108. If there is no pattern characteristic which can distinguish a new contract document type from other known contract document types on either the first page or the last page of this new contract document type, pattern characteristics at other pages besides the first and last pages can also be used. Other examples of pattern characteristics are special headers or footers of a contract document, dates, length of the documents, etc.

Then, in block 112, the administrator enters the location for each pattern (block 110) on the template for document type patterns. The location may include a specific page number, paragraph number, line number, word number, etc. Instead of an exact number, a range of numbers or within certain numbers can also be used. This is particularly true for the line location where the exact line number can vary and depend on the length of contract document content for different contract documents of the same contract document type. The number of lines and number of words or terms for each line involved in the pattern are also entered. The pattern matrices are constructed in block 114.

For the contract data, the administrator first has to decide what contract data is needed for extraction for this new contract document type in block 106. Then, the administrator has to determine the corresponding data tags of these contract data in block 118. For each contract data and its tag, the module 14 enters locations on the template for contract data tags in block 120 and 112. Again, the location may include a specific page number, paragraph number, line number, word number, etc. Usually, two to five words or terms are enough to identify a contract data tag. A number of word tokens to be extracted for contract data corresponding to a particular contract data tag are also entered in block 112. Word tokens extracted do not necessary locate in the same line. The word tokens can be located on several consecutive lines.

The administrator module 14 will construct the document type pattern matrices in block 114 and generate a list of contract data tags in block 122 for this new contract document type entering the system. The pattern matrices and contract data tags may be stored in a local database in block 116 or may be transferred to a remote database 126.

An application server 124 may include the remote database 126 which can stored pattern matrices and contract data tags in block 128. The application server 124 may be accessed via a network 130 such as the Internet or the like.

Figure 3:
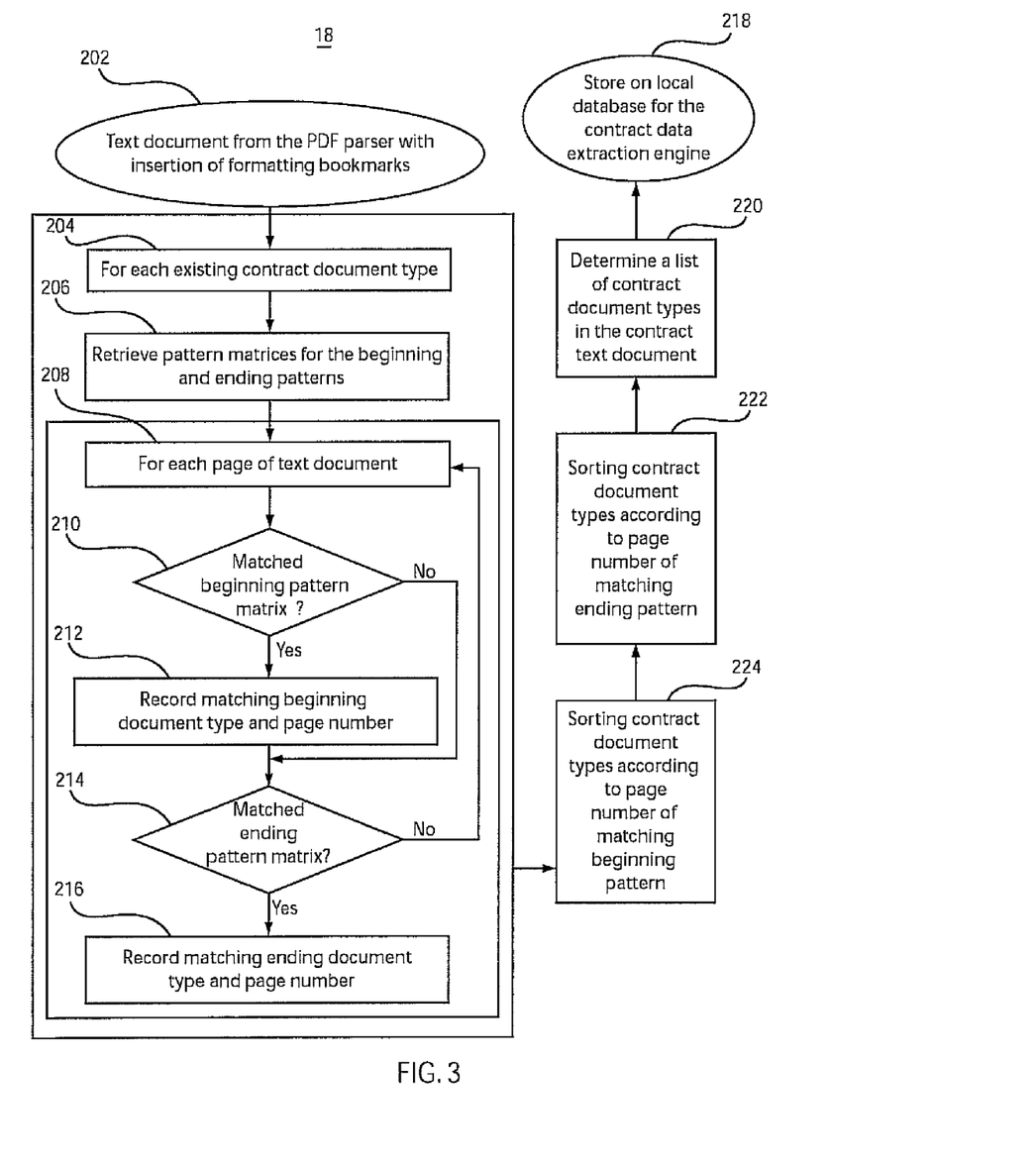
FIG. 3 is a block/flow diagram depicting a contract pattern recognition engine in accordance with an illustrative embodiment.

Referring to FIG. 3, a block/flow diagram illustrates steps performed by a contract pattern recognition engine 18 for a contract text document. The engine 18 has to read and decode those extra text lines with special coding characters or words of bookmarks from the contract text document generated by the PDF parser in block 202. These extra text lines are originally inserted into the contract text document by the PDF parser 16 (FIG. 1) to indicate a new page or a new paragraph. For each contract document type (204), the engine 18 retrieves the pattern matrices including the beginning and ending patterns of each known or existing contract document type in the system in block 206. In blocks 208, 210 and 214, the engine 18 compares the beginning and ending patterns of each known or existing contract document type to each page pattern of this contract text document. In block 212, the engine 18 records the contract document type and the page number of a particular page in the contract text document if all the characteristics of its beginning pattern matching a particular page in the contract text document. The engine also records the contract document type and the page number of a particular page in the contract text document if all the characteristics of its ending pattern matching a particular page in the contract text document in block 216.

The matching page numbers along with the matching contract document types are sorted for both the beginning and ending patterns in blocks 224 and 222, In block 220, based on this information, the engine can then determine a list of contract document types in the contract text document. The page numbers on the contract text document corresponding to the beginning and ending pages of those contract document types in the list are also determined. This information is stored on a local database for the contract data extraction engine to use in block 218.

Pattern matrices are used to compare the pattern characteristics of all the existing or known contract document types with the contract text document of an electronic contract. Let a pattern matrix of a known contract document type be q, the entries in q are simply the occurrence of a list of terms or words in different lines. The occurrence of terms has to be in a specific order according to a term list, and the same term can appear in the term list more than one time. Occurrence is set to 1 while non-occurrence is set to 0. As mentioned above, each pattern characteristic may involve two to five lines and two to ten terms per line. If there are 5 lines and each line includes a list of 10 terms in a specific order, the maximum dimensions of a pattern matrix is 50×5 assuming that no more than one line has the same terms arranged in the same order in the term list.

Figure 4:
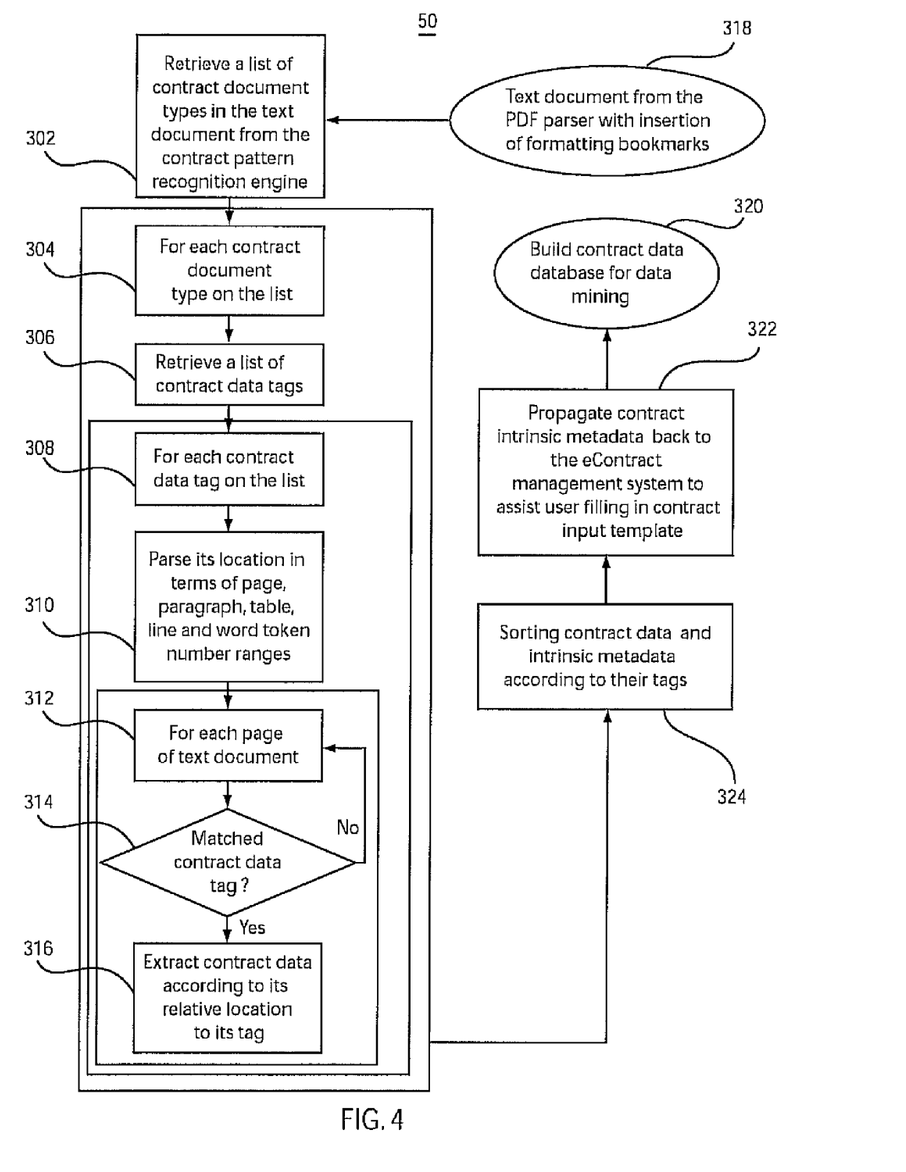
FIG. 4 is a block/flow diagram depicting a contract data extraction engine in accordance with an illustrative embodiment.

Referring to FIG. 4, a block/flow diagram is shown for a contract data extraction engine 50 in accordance with an illustrative embodiment. A contract text document is generated by the PDF parser 16 (FIG. 1) in block 31B when an electronic contract including a number of documents in PDF format enters the system. The contract pattern recognition engine 18 (FIG. 1) determines and constructs a list of contract document types in this contract text document in block 302. Then, the contract data extraction engine 50 will retrieve this list of contract document types from the local database in block 304. The extraction engine 50 will also retrieve a list of contract data tags corresponding to each document type on the type list in block 306. For each contract data tag on the tag list (block 308), engine 50 will parse its location in terms of page, paragraph, table, line and word token number in block 310. A range of numbers or within certain numbers can also be used instead of an exact number. The number of terms involved in this contract data tag is also parsed. Moreover, the number of word tokens to be extracted for the contract data corresponding to this particular contract data tag is also parsed.

Similar to the contract pattern recognition engine, the contract data extraction engine 50 compares the pattern of a contract data tag to the line pattern of each page of this contract text document in block 312 and 314. Instead of using a pattern matrix for the comparison as described above, engine 50 uses a pattern vector in a similar way for comparison. If a particular line pattern matches the pattern of a contract data tag, contract data corresponding to this particular contract data tag will be extracted according to the parsed number of word tokens to be extracted in block 316. Word tokens extracted do not necessary have to be located along the same line. The word tokens can be located on several lines.

In block 324 the contract data and intrinsic metadata is sorted according to their tags. The intrinsic metadata is propagated back to the management system 20 (FIG. 1) to assist filling out contract input plates by a user in block 322. In block 320, a contract database is built for data mining.

Turning now to an illustrative example, which will illustratively describe some of the present principles, a matrix r of the same dimension as matrix q is formed from the contract text document. Similarly, the entries in r are the occurrence of the same list of terms in different lines. A different matrix r can be formed by shifting the first starting line down a particular page of the contract text document. The number of these different matrices r in this particular page is the number of lines in the page minus the number of lines in the pattern, for example, 5 in this case.

Let P be the dot product of matrix q and r divided by the dot product of matrix q and q according to Equation (1)

$$P = (q \cdot r)/(q \cdot q) \quad (1)$$

As a result, if P equals 1 for any matrix r in a particular page, then this particular page matches the pattern characteristics of a known contract document type. Thus, the particular contract text document includes this known contract document type. If the pattern matrix q is from the beginning pattern in the first page, then this particular page is the first page of a known contract document type. Similarly, if the pattern matrix q is from the ending pattern in the last page, then this particular page is the last page of a known contract document type. Other pages in the known contract document type can also be identifies in a similar way.

An electronic contract that includes a plurality of document types is loaded in the management system 20 (FIG. 1). The contract (e.g., Lease Agreement Document) is in PDF format and includes two document types, "Term Lease Supplement" and Addendum to Term Lease", which are of course in PDF format as well. After loaded in to the system, the format of the contract will trickle different format type library's APIs which will be used to extract text from the contract depending on format type. In this case, the format type is PDF and the library will include APIs from ADOBE™. A text file will be created. The extraction results in some formatting words being added during the text extraction. With the format type library's APIs, these formatting words are removed and replaced with either a blank space or line feed, etc. as described above. Then, this text file is stored in a text content database ready for a content search engine to carry out any content search.

There are a number of common words, such as "by", "the", "and"; since these common words do not pay a role in the pattern recognition engine, they are also removed from the text file. A list of common words can be supplied by the administrator by entering them into a template or obtaining them from a dictionary book company, etc.

From this particular "Term Lease Supplement" contract document type, every contract document of the lease type in this illustration would include the following 11 lines of heading as its pattern characteristics.

Term Lease Supplement
Date Prepared: Page
Customer Supplement
Customer Address Installed Location
Location Address
Term Lease Master Agreement
Associated Supplement
Summary Supplement
Amendment
Addendum
Customer Reference: Quote Letter There are usually no more than ten terms in a line. Four to five lines will be generally be enough to form the pattern characteristics. In this case, a matrix of 4×11 is formed as the pattern characteristics for the heading for this particular contract document type. Let this pattern recognition matrix be "q". A pattern matrix may be constructed by setting to one every term entry with a pattern characteristic. Otherwise, set it to 0. For the list of terms above, we get:

Thus, $$q = \begin{matrix} 1110 \\ 1110 \\ 1100 \\ 1111 \\ 1100 \\ 1111 \\ 1100 \\ 1100 \\ 1000 \\ 1000 \\ 1111 \end{matrix}$$

This is a one time setup requirement for any new contract document type coming into the system. A template for entering pattern characteristics is provided for the administrator. Usually, the pattern characteristics are located in the heading of the first page and the ending of the last page. However, they can be located in the body of the first and the last pages. Pattern characteristics have to be entered preferably for the first and last page of any new contract document type. If no pattern characteristics can be found on either the first or last page, then pattern characteristics of other pages can be used provided that the number of pages after the first page or the number of pages before the last page is provided for this page with pattern characteristics.

This information is used to identify the first and the last page of such a contract document type if it is inside or presented in the extracted text file. Thus, the number of documents and their contract document types can be determined in the extracted text file by searching the known pattern characteristics of all the contract document types in the system by the following steps.

First, pattern characteristics of the first page of each known contract document type are searched for the first page of the extracted text file. A matrix r is formed from the search result. For every term search, set a value in the matrix to 1 if a match is found for the extracted words in the text when compared to a list. Otherwise, set it to 0. The search has to be carried out in the order of pattern characteristics and is preferably a forward search. As a result, whether the first page of this extracted text file is the first page of a particular contract document type or not, will depend on value of P from Equation (1).

If P equals 1, this result will indicate that the first page of the file indeed is the first page of this particular contract document type. Otherwise, it is not. Similarly, the end page will be located. In addition, any other specific page of a particular contract document type can be located in this way if metadata is extracted on that specific page. A particular line item can also be located using this method if we need to find certain value such as total amount for a particular line item.

A template for the administrator to enter a list of metadata tags and their page location that the administrator wants to add as extra to the list of metadata from a particular contract document type is also provided. After a list of contract document types on the extracted text file has been determined, a list of metadata tags corresponding to each contract document type is used to build the metadata database for this particular electronic contract. Once the system has completed building the metadata database, it will trickle a metadata extraction engine to execute, extract metadata and propagate the metadata into the graphical user interfaces of a user module. This will save the user's time in entering these metadata and avoid any mistakes in entering the wrong metadata.

Furthermore, since the extracted text file still includes a large number of common terms, such as the standard legal terms, which do not pay any role in semantic search, these common terms are eliminated from the file. A number of templates are provided for the administrator to enter these legal terms. Then, the file is used to build a semantic indexing database for semantic search using Laten Semantic Indexing (LSI) techniques. An administrator can enter a list of key terms on templates provided by the system. These key terms can be used to build a correlation database using Correlated Filamentous Propagation (CFP) methods for electronic contract relationship search as well as other data mining techniques.

Implementation: The features and functions of the automatic contract data extraction system described herein have been implemented and integrated with an electronic management and process system at IBM™. The ADOBE™ PDF library application programming interfaces (APIs) were used to parse PDF documents into a text document in the PDF parser of this system. However, other PDF parsers can also be used.

The contract data extraction system described herein provides an automated and efficient way to extract contract data for electronic contracts composed of a number of documents in, e.g., PDF format. The system has solved a number of difficult problems involving the comparison of patterns or pattern recognition. The pattern recognition technique described is based on the calculation of the dot product of pattern matrices. Thus, the system needs an administrator to input a distinct pattern of a new contract document type. This is a rather time consuming processing step for the user. However, this step is a one time setup for any new contract document type coming into the system.

There are many advantages of this system. Some of these include: 1) The number of different contract document types can vary. New contract document types can be input into the system at any time. 2) A list of contract data to be extracted can also be modified by modifying the corresponding list of data tags. 3) Intrinsic contract metadata extracted from the electronic contract document can be propagated back in the electronic contract management system right after the user uploads the electronic contract document into the system. The extracted intrinsic contract metadata can be displayed in the graphical user interface of the user module to assist the user in entering contract information of the electronic contract that the user just submitted into the system. It has been found to save users a lot of time from manually entering contract data from scratch. The system also avoids wrong contract metadata mistakenly entered by the user. 4) The present system also provides an efficient way to generate contract text content database for key word or term search. Other advantages and benefits are also provided in accordance with the present principles.

Having described preferred embodiments for systems and methods to extract data automatically from a composite electronic document (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A system for automatically extracting contract data from electronic contracts, comprising:

an administrator module configured to provide templates for inputting document patterns and a list of contract data tags for each of a plurality of contract document types, said document patterns being based on at least one predetermined region of a document, one of said regions including the first line of the document;

a processor having a parser configured to convert an electronic contract document into a contract text document and reformat the contract text document to provide a pattern for the contract text document;

a pattern recognition engine configured to determine a list of contract document types in the electronic contract by comparing and matching patterns of all known contract document types with the pattern of the contract text document; and a contract data extraction engine configured to extract contract data for each contract document type on the list.

2. The system as recited in claim 1, wherein the administrator module is configured to construct pattern matrices to provide the templates for inputting document patterns.

3. The system as recited in claim 1, wherein the administrator module stores pattern matrices and contract data tags for comparison with input electronic contracts.

4. The system as recited in claim 3, wherein the parser formats the contract text document to eliminate less relevant information and to permit comparison with the pattern matrices and contract data tags.

5. The system as recited in claim 4, wherein the parser formats the contract text document by inserting formatting bookmarks.

6. The system as recited in claim 1, wherein the administrator module is configured to retrieve a list of contract data tags and extracts contract data accordingly for each contract document type on the list.

7. The system as recited in claim 1, wherein the administrator module is configured to provide beginning and ending pattern matrices for each known document type.

8. The system as recited in claim 1, wherein the administrator module is configured to determine a list of document types in the contract text document by comparing and matching pattern matrices using a dot product calculation.

9. The system as recited in claim 1, wherein the administrator module is configured to determine to a list of data tags corresponding to a document type by comparing and matching line pattern vectors.

10. A method for automatically extracting contract data from electronic contracts, comprising:
providing templates for inputting document patterns and a list of contract data tags for each of a plurality of contract document types, said document patterns being based on at least one predetermined region of a document, one of said regions including the first line of the document;
parsing an electronic contract document, using a processor, to convert the electronic contract document into a contract text document;
determining a list of contract document types in the electronic contract by comparing and matching patterns of all known contract document types with the pattern of the contract text document; and
extracting contract data for each contract document type on the list.

11. The method as recited in claim 10, wherein providing includes constructing pattern matrices to provide the templates for inputting document patterns.

12. The method as recited in claim 10, further comprising storing pattern matrices and contract data tags for comparison with input electronic contracts.

13. The method as recited in claim 12, wherein parsing includes and reformatting the contract text document to eliminate less relevant information to permit comparison with the pattern matrices and contract data tags.

14. The method as recited in claim 13, wherein reformatting includes reformatting the contract text document by inserting formatting bookmarks.

15. The method as recited in claim 10, further comprising retrieving a list of contract data tags and extracting contract data accordingly for each contract document type on the list.

16. The system as recited in claim 10, wherein providing includes providing beginning and ending pattern matrices for each known document type.

17. The method as recited in claim 10, wherein determining a list of document types includes comparing and matching pattern matrices using a dot product calculation.

18. The method as recited in claim 10, wherein determining includes determining a list of data tags corresponding to a document type by comparing and matching line pattern vectors.

19. The method as recited in claim 10, further comprising searching document patterns and contract data tags for each of a plurality of contract document types in a database.

20. A computer program product for automatically extracting contract data from electronic contracts comprising a non-transitory computer useable storage medium including a computer readable program, wherein the computer readable program when executed on a computer causes the computer to perform:
providing templates for inputting document patterns and a list of contract data tags for each of a plurality of contract document types, said document patterns being based on at least one predetermined region of a document, one of said regions including the first line of the document;
parsing an electronic contract document to convert the electronic contract document into a contract text document;
determining a list of contract document types in the electronic contract by comparing and matching patterns of all known contract document types with the pattern of the contract text document; and
extracting contract data for each contract document type on the list.

\* \* \* \* \*